Nov. 15, 1949 F. J. YOUNG 2,488,071
DRAWWORKS TRANSMISSION
Filed Nov. 26, 1945 2 Sheets-Sheet 1

Inventor
Forrest J. Young
By
Lyon & Lyon Attorneys

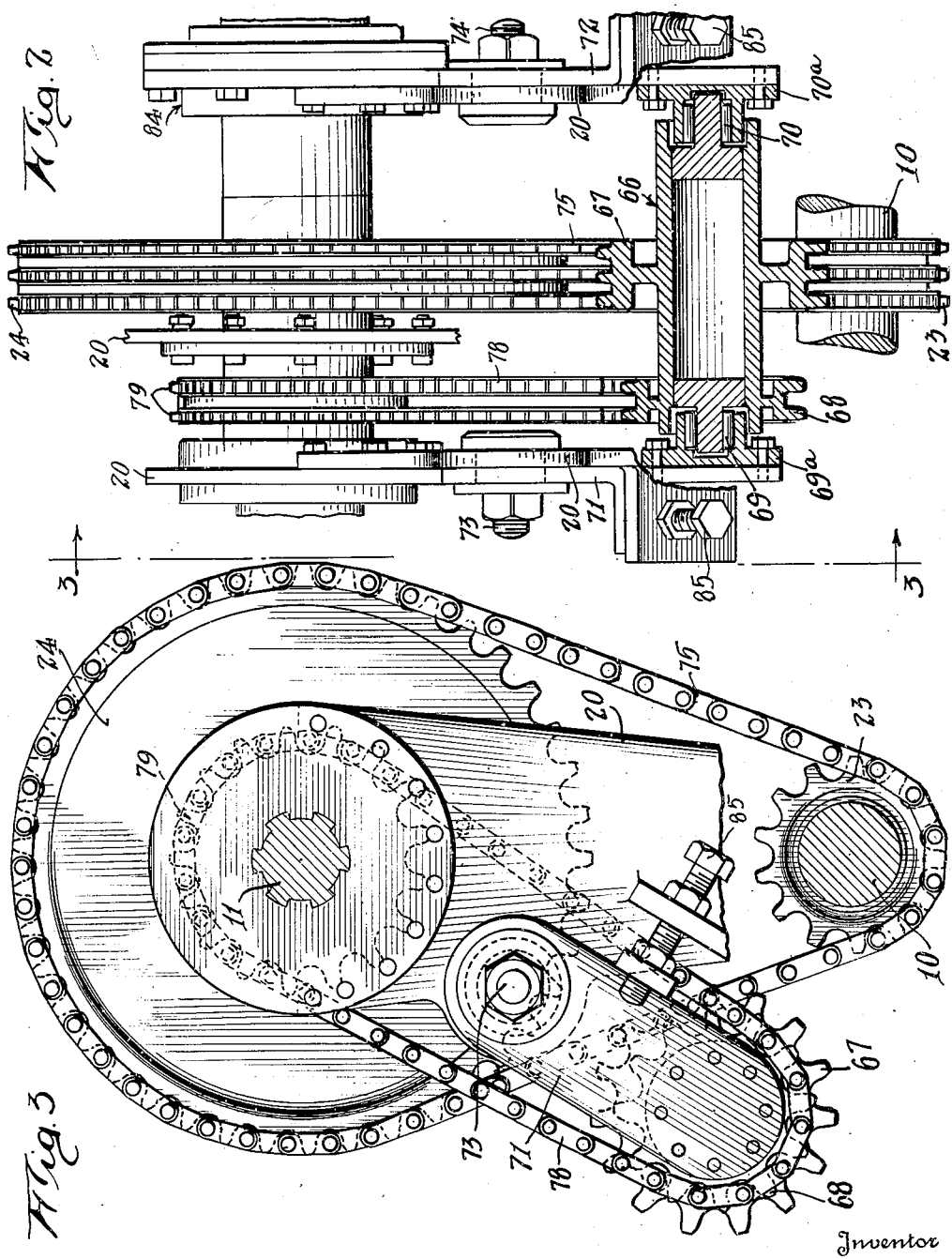

Patented Nov. 15, 1949

2,488,071

UNITED STATES PATENT OFFICE 2,488,071

DRAWWORKS TRANSMISSION

Forrest J. Young, Los Angeles, Calif., assignor to
The National Supply Company, Pittsburgh, Pa.,
a corporation of Pennsylvania Application November 26, 1945, Serial No. 630,790

12 Claims. (Cl. 74—218)

This invention relates to improvements in apparatus for the drilling of wells and is directed in particular to a novel form of change speed transmission used for driving a drawworks of the type employed in a rotary drilling rig.

It is the principal object of this invention to provide a drawworks transmission for driving one shaft from another at a plurality of speeds, in which only torque loads are imposed upon the shafts, and any bending loads are substantially eliminated from the shafts, thereby permitting the use of smaller diameter shafts.

It is another object of this invention to provide a change speed transmission of the type utilizing chains for power transmission in which all of the drive chains not actually under load are at rest, and no chain is idling while another carries the load.

It is a further object to provide a chain transmission having a plurality of forward speeds and a novel form of reverse drive.

Other objects and advantages of this invention will be apparent from the following detailed description of a preferred embodiment thereof as illustrated in the accompanying drawings.

Figure 2 is a fragmentary plan view of a portion of the apparatus shown in Figure 1.

Figure 3 is a sectional elevation taken on the line 3—3 of Figure 2.

Figure 1:
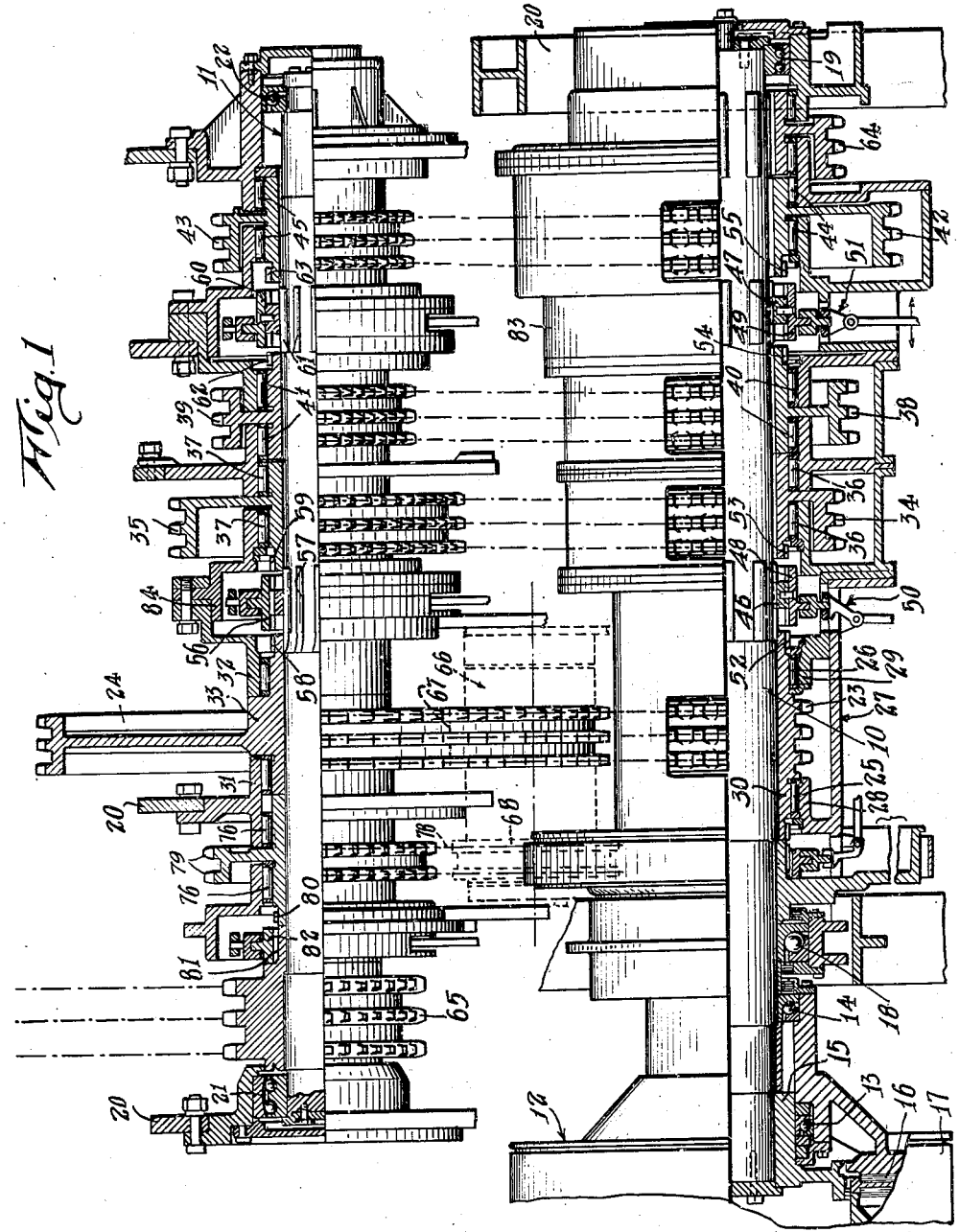
Figure 1 is a plan view partly in section illustrating a preferred embodiment of this invention.

In the drawings, 10 is the driving shaft and 11 is the driven shaft. An engine not shown, is suitably connected to a clutch 12 which is rotatably mounted on the shaft 10 by means of bearing assemblies 13 and 14. A hub 15 is fixed on the end of a driving shaft 10 and engages a portion of the friction plate assembly 16 in the conventional manner. The power applied to the outer shell 17 of the clutch 12 from the engine is transmitted through the friction plate assembly 16 to the hub 15 and shaft 10. The shaft 10 is supported on axially spaced bearings 18 and 19 carried by a frame 20. This same frame 20 supports the bearings 21 and 22 on which the shaft 11 is rotatably mounted. A plurality of driving connections are provided between the drive shaft 10 and the driven shaft 11, and as shown, may consist of pairs of sprockets associated with the shafts and connected by driving chains. It is recognized that intermeshing gears could be substituted for the sprockets shown without departing from the spirit of this invention.

The low speed transmission includes a sprocket 23 encircling the shaft 10 in alignment with the driven sprocket 24 encircling the driven shaft 11. Both of these sprockets 23 and 24 are independently rotatable in respect to their respective shaft but neither is supported on its shaft. A supporting means for the driving sprocket 23 comprises a pair of axially spaced bearings 25 and 26 carried in a stationary shell generally designated 27 and provided with inwardly extending cylindrical portions at 28 and 29. The bearing assemblies 25 and 26 are positioned in the annulus defined between the inwardly extending cylindrical portions 28, 29 and the hub 30 of the sprocket 23. Similarly, inwardly extending cylindrical portions 31 and 32 are carried by the frame 20 and encircling portions of the hub 33 of the sprocket 24. In this manner, the sprockets 23 and 24 are mounted for rotation about their respective shafts but the lateral pull due to the chain tension is not carried by the shaft. Instead, this lateral pull is taken directly to the frame. The result of such construction is that a much smaller shaft may be used since the bending loads due to chain tensions are taken directly by the frame and not by the shafts.

In a manner similar to that just described for the low speed drive 23, 24, the second speed, third speed, and high speed transmissions are similarly mounted. Thus, the sprockets 34 and 35, forming the second speed drive, are rotatably mounted in bearings 36 and 37, respectively, which are carried by the frame. It will be noted from the drawings that each of the sprockets consists of an external rim joined to the hub by a relatively thin web section. The cylindrical extensions on the frame, which carries the roller bearings, may project within the rim section, and thus the entire hub section of the sprocket, with the exception of the relatively thin web section, is available for the mounting of the bearings.

Sprockets 38, 39, forming the third speed drive, are rotatably supported on bearings 40 and 41 carried by the frame. Sprockets 42 and 43, which comprise the high speed drive, are rotatably supported on the frame through bearings 44 and 45.

In order to engage the driving sprockets with the driving shaft 10, clutch means are provided. As shown in the drawings, such clutch means include collars 46 and 47 slidably and non-rotatably splined on the driving shaft. Each of these collars has an external spline adapted to receive a clutch element, which has a corresponding series of internal splines. Each collar and clutch element is fixed together to operate as a unit, designated as a clutch ring. A shifter mechanism 50, 51 is provided for each of the clutch rings 48, 49 so that the clutch rings may be selectively engaged with either one of a pair of driving sprockets. Thus, shiftable clutch ring 48 may be brought into driving engagement with the splined ring 52 on the hub 30 of sprocket 23 or it may be shifted into driving engagement with the splined ring 53 formed on the hub of the driving sprocket 34. In like manner the clutch ring 49 may be shifted axially into engagement with the splined ring 54 formed on the hub of the driving sprocket 38 or may be shifted into engagement with the splined ring 55 formed on the hub of the driving sprocket 42. A similar clutch means is provided for the driven sprockets 24, 35, 39, and 43. Thus, clutch ring 56 is adapted to be shifted on spline 57 into engagement with either the spline ring 58 on the driven sprocket 34 or with the spline ring 59 on the driven sprocket 35. Also, the shiftable clutch ring 60, which is shiftable on the spline 61, is adapted to engage the spline ring 62 on the driven sprocket 39 or the spline ring 63 on the driven sprocket 43. It will be understood from the foregoing description that any one of the drives 23, 24 or 34, 35 or 42, 43 may be engaged by shifting the appropriate pair of clutch rings. The sprocket 64, which is splined on the driving shaft 10 adjacent the supporting bearing 19, is not a part of the transmission connections between the shafts 10 and 11 but is a power compounding sprocket for connection with another driving shaft, not shown, commonly used in oil field drilling rigs.

The sprocket 65 fixed on the driven shaft 11 adjacent the supporting bearing 21 is the power take-off sprocket whereby the transmission may drive a drawworks or a rotary machine, not shown, of the type generally employed in the drilling of a well. In addition to the four forward speeds available through the transmission connections just described, a reverse drive is provided between the shafts 10 and 11. This reverse drive includes a dual sprocket member 66 having a driving sprocket 67 and a driven sprocket 68 integrally connected therewith. This dual sprocket member is rotatably supported on bearings 69 and 70 carried by hangers 69ª and 70ª bolted to the supporting plates 71 and 72. These plates are pivotally secured to the frame 20 by means of bolts 73 and 74. The sprocket 67 is driven by the same chain 75 that connects the low speed sprockets 23 and 24, but the sprocket 67 engages the opposite side of the chain so that it is rotated in a reverse direction with respect to the sprockets 23 and 24. The sprocket 68 is aligned with the sprocket 79 rotatably mounted about the axis of the shaft 11 but carried in the bearings 76 in the frame 20. A chain 78 connects the sprockets 68 and 79. From this description it will be apparent that when the low speed drive 23, 24 is in operation, the sprocket 79 is being rotated in a reverse direction with respect to the shaft 11. A clutch means is provided for connecting the reverse sprocket 79 in direct driving relation with the power take-off sprocket 65 and shaft 11. This clutch means includes an external spline ring 80 formed on the hub of the sprocket 79 and a corresponding external spline ring 81 formed on the hub of the adjacent sprocket 65. A shiftable collar 82, having an internal spline ring, is adapted to drivably connect the hubs of the sprockets 79 and 65. As the size of the driven sprocket increases with respect to the size of the driving sprocket, the need increases for an idler sprocket to maintain chain tension. Therefore, this reverse drive through the sprocket 79 is preferably associated with the low speed driving connection 23, 24 since the driving sprocket 67 acts as an idler to maintain proper chain tension in the chain 75. Adjusting screws 85 are provided for maintaining the correct tension in the drive chain 75, or for completely disengaging the idler sprocket 67 from the drive chain 75.

It will be noted that the stationary frame 20 is shown as a series of barrel sections 83 bolted together for supporting the sprockets associated with the shaft 10, whereas the frame construction shown in connection with the sprockets associated with the shaft 11 is of a different type. The frame construction illustrated in connection with the shaft 11 comprises a series of bearing housings 84, each provided with cylindrical extensions such as those designated as 31 and 32 in connection with the mounting for the sprocket 24. For the purposes of this invention it is immaterial which of these two frame constructions is utilized. The important point is that the sprockets are mounted for independent rotation about their respective shaft but that the mounting bearings are carried by the frame 20 and not by the shaft. An important feature which results from this construction in which none of the sprockets is fixed upon a shaft is that the only drive chain which is operating at any one time is the drive chain which is operating under load. None of the chains are idling. This is an important advance in drawworks transmissions since there are long periods of time when only one of the drives between the shafts is being employed. By eliminating idling of the other drives, the wear and noise are substantially reduced.

Having fully described my invention, it is to be understood that I do not wish to be limited to the details herein set forth, but my invention is of the full scope of the appended claims.

I claim:

1. In a change speed transmission, the combination of a frame, first and second shafts rotatably supported on said frame in parallel relation, first and second sprockets each encircling a portion of the first shaft, a hub on each sprocket, means for rotatably supporting each sprocket on the frame independently of the first shaft, including a stationary shell fixed on the frame and encircling a portion of each sprocket hub to define an annulus therebetween, a bearing within each annulus, releasable clutch means for selectively engaging either sprocket in driving relation with the first shaft, a pair of cooperating sprockets associated with the second shaft, and a drive chain connecting each of the first and second sprockets with one of the cooperating sprockets associated with the other shaft.

2. In a change speed transmission, the combination of a frame, first and second shafts rotatably supported on said frame in parallel relation, first and second sprockets each encircling a portion of the first shaft, a hub on each sprocket, means for rotatably supporting each sprocket on the frame independently of the first shaft, including a stationary shell fixed on the frame and encircling a portion of each sprocket hub to define an annulus therebetween, a bearing within each annulus, a collar fixed on the first shaft and operatively positioned between said sprockets, releasable clutch means including an axially shiftable element adapted to selectively engage either of said sprockets in driving relation with said collar, a pair of cooperating sprockets associated with the second shaft, and a drive chain connecting each of the first and second sprockets with one of the cooperating sprockets associated with the other shaft.

3. In a device of the class described, the combination of a frame having a shaft rotatably supported thereon, first and second sprockets each encircling a portion of the shaft, a hub on each sprocket, means for rotatably supporting each sprocket on the frame independently of the shaft, including a stationary shell fixed on the frame and encircling a portion of each sprocket hub, bearing means operatively positioned between each hub and its respective shell, releasable clutch means for selectively engaging either sprocket in driving relation with the shaft, a pair of cooperating sprockets each rotatably supported on the frame, and a drive chain connecting each of the first and second sprockets with one of the cooperating sprockets.

4. In a change speed transmission, the combination of a frame, a pair of shafts rotatably supported on the frame, a pair of sprockets encircling one of the shafts, a pair of sprockets encircling the other of the shafts, a hub on each sprocket, means for rotatably supporting each sprocket on the frame independently of its respective shaft, said means including a stationary shell fixed on the frame and encircling a portion of each hub, bearing means operatively positioned between each hub and its respective shell, releasable clutch means associated with each sprocket for selectively engaging it in driving relation with the shaft, and drive chains connecting each one of the sprockets associated with one shaft to one of the sprockets associated with the other shaft, whereby the driving torque is carried by the shafts and the transverse load due to chain tension is carried by the frame independently of the shafts.

5. In a change speed transmission, the combination of a frame, a pair of shafts rotatably supported on the frame, a pair of sprockets encircling one of the shafts, a pair of sprockets encircling the other of the shafts, a hub on each sprocket, means for rotatably supporting each sprocket on the frame independently of its respective shaft, said means including a stationary shell fixed on the frame and encircling a portion of each hub to define an annulus therebetween, a bearing within each annulus, a collar fixed on one of the shafts between two of said sprockets, releasable clutch means including an axially shiftable element adapted to selectively engage either of the latter said sprockets in driving relation with said collar, and drive chains connecting each one of the sprockets associated with one shaft to one of the sprockets associated with the other shaft, whereby the transverse load due to chain tension is carried by the frame independently of the shafts.

6. In a device of the class described, the combination of a frame, a shaft rotatably supported by the frame, a sprocket encircling a portion of the shaft and provided with a rim, teeth on the rim for engagement with a chain, an annular web extending inwardly from the rim radially of the shaft, a cylindrical hub comprising hub sections extending axially from both sides of the web, means for rotatably supporting each hub section on the frame independently of the shaft, including a pair of stationary shell sections fixed on the frame and each encircling a portion of one of said hub sections to define an annulus therebetween, a bearing within each annulus, and releasable means for selectively engaging the hub in driving relation with the shaft.

7. In a change speed transmission, the combination of a frame, a pair of parallel shafts rotatably supported by the frame, low-speed and high-speed driving connections whereby the first shaft may drive the second shaft at low or high speed, one of said driving connections including a small sprocket associated with the first shaft and a large sprocket associated with the second shaft, the large sprocket being mounted coaxially of the second shaft and independently rotatable with respect thereto, a drive chain operatively connecting the sprockets, an idler member rotatably mounted about an axis parallel to the shafts and positioned outside the path of motion of the drive chain, an idler sprocket on said member engaging said drive chain, a reverse sprocket mounted for independent rotation coaxially of the second shaft, means whereby the idler member may drive the reverse sprocket, and clutch means for selectively engaging either the large sprocket or the reverse sprocket in driving relation with the second shaft.

8. In a change speed transmission, the combination of a frame, first and second shafts rotatably supported on said frame in parallel relation, first and second drive elements each encircling a portion of the first shaft, a hub on each drive element, means for rotatably supporting each drive element on the frame independently of the first shaft, including a stationary shell fixed on the frame and encircling a portion of each hub to define an annulus therebetween, a bearing within each annulus, releasable clutch means for selectively engaging either drive element in driving relation with the first shaft, a pair of cooperating drive elements associated with the second shaft and arranged in driving relation with respect to said first and second drive elements.

9. In a change speed transmission, the combination of a frame, first and second shafts rotatably supported on said frame in parallel relation, first and second drive elements each encircling a portion of the first shaft, a hub on each drive element, means rotatably supporting each drive element on the frame independently of the first shaft, including a stationary shell fixed on the frame and encircling a portion of each hub to define an annulus therebetween, a bearing within each annulus, a collar fixed on the first shaft and operatively positioned between said drive elements, releasable clutch means including an axially shiftable element adapted to selectively engage either of said drive elements in driving relation with said collar, a pair of cooperating drive elements associated with the second shaft, and arranged in driving relation with respect to said first and second drive elements.

10. In a device of the class described, the combination of a frame having a shaft rotatably supported thereon, first and second drive elements each encircling a portion of the shaft, a hub on each drive element, means for rotatably supporting each drive element on the frame independently of the shaft, including a stationary shell fixed on the frame and encircling a portion of each hub, bearing means operatively positioned between each hub and its respective shell, releasable clutch means for selectively engaging either drive element in driving relation with a shaft, a pair of cooperating drive elements each rotatably supported on the frame and arranged in driving relation with respect to said first and second drive elements.

11. In a device of the class described, the combination of a frame, a shaft rotatably supported by the frame, a drive element encircling a portion of the shaft and provided with a rim, power transmission means on the rim, an annular web extending inwardly from the rim radially of the shaft, a cylindrical hub comprising hub sections extending axially from both sides of the web, means for rotatably supporting each hub section on the frame independently of the shaft, including a pair of stationary shell sections fixed on the frame and each encircling a portion of one of said hub sections to define an annulus therebetween, a bearing within said annulus, and releasable means for selectively engaging the hub in driving relation with the shaft.

12. In a device of the class described, the combination of: a frame; a shaft rotatably supported by the frame; a drive element encircling a portion of the shaft and provided with a central web; a cylindrical hub comprising hub sections extending axially from both sides of the web; means for rotatably supporting each hub section on the frame independently of the shaft, including a pair of stationary shell sections fixed on the frame and each encircling a portion of one of said hub sections to define an annulus therebetween; a bearing within said annulus; releasable means for selectively engaging the hub in driving relation with the shaft; a rim on the drive element encircling one of said shell sections; and power transmission means on the rim, the said web serving to connect the rim with said hub.

FORREST J. YOUNG.

REFERENCES CITED

The following references are of record in the file of this patent:

UNITED STATES PATENTS

| Number | Name | Date |
|---|---|---|
| 85,012 | King | Dec. 15, 1868 |
| 881,545 | Caps | Mar. 10, 1908 |
| 1,651,959 | Meyers | Dec. 6, 1927 |

FOREIGN PATENTS

| Number | Country | Date |
|---|---|---|
| 524,855 | Great Britain | Aug. 15, 1940 |